(12) United States Patent
Taylor

(10) Patent No.: US 7,926,624 B1
(45) Date of Patent: Apr. 19, 2011

(54) CYLINDER BLOCK BRAKE

(75) Inventor: Michael W. Taylor, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 962 days.

(21) Appl. No.: 11/744,618

(22) Filed: May 4, 2007

(51) Int. Cl.
*B61K 7/20* (2006.01)

(52) U.S. Cl. ............... 188/60; 188/31; 188/69; 60/442

(58) Field of Classification Search ............ 188/60, 188/31, 69, 72.7; 60/442, 487–492; 192/17 R, 192/219.5, 148; 475/23, 29, 83; 180/6.48, 180/308
See application file for complete search history.

(56) References Cited

U.S. PATENT DOCUMENTS

| | | | |
|---|---|---|---|
| 1,977,588 A | | 10/1934 | Matson |
| 3,703,941 A | * | 11/1972 | Ohie et al. ............... 188/31 |
| 3,987,879 A | | 10/1976 | Longshore et al. |
| 4,120,383 A | * | 10/1978 | Kawamoto ............... 188/31 |
| 4,177,886 A | * | 12/1979 | Hiraiwa et al. ............ 192/4 A |
| 4,633,979 A | | 1/1987 | Edwards |
| 4,845,949 A | | 7/1989 | Shivvers et al. |
| 5,314,387 A | | 5/1994 | Hauser et al. |
| 5,794,443 A | | 8/1998 | Shimizu |
| 6,122,996 A | | 9/2000 | Hauser et al. |
| 6,185,936 B1 | | 2/2001 | Hauser et al. |
| 6,256,989 B1 | | 7/2001 | Hauser et al. |
| 6,301,884 B1 | * | 10/2001 | Hauser et al. ............... 60/435 |
| 6,419,068 B1 | * | 7/2002 | Stephan et al. ............ 192/219.5 |
| 6,454,673 B1 | * | 9/2002 | Jolliff ............... 475/83 |
| 6,651,427 B1 | | 11/2003 | Poplawski et al. |
| 6,775,976 B1 | | 8/2004 | Phanco et al. |
| 6,811,509 B1 | | 11/2004 | Langenfeld et al. |
| 6,968,687 B1 | | 11/2005 | Poplawski et al. |
| 7,134,276 B1 | | 11/2006 | Langenfeld et al. |
| 7,476,171 B1 | * | 1/2009 | Langenfeld et al. ............ 475/83 |
| 7,487,635 B2 | * | 2/2009 | Iida ............... 60/487 |

FOREIGN PATENT DOCUMENTS

JP   2000-009023   1/2000

* cited by examiner

*Primary Examiner* — Robert A Siconolfi
*Assistant Examiner* — Mariano Sy
(74) *Attorney, Agent, or Firm* — Neal, Gerber & Eisenberg LLP

(57) ABSTRACT

A cylinder block brake for a hydrostatic transmission or transaxle is provided. A pawl and return spring are located in a housing adjacent to a motor cylinder block. The pawl has a first, biased position where it is not engaged to the motor cylinder block and a second, braking position where it is engaged to the motor cylinder block. A brake actuation shaft which engages the pawl is located in and supported, at least partially, by at least one housing member. The brake actuation shaft is retained in the housing through the interface of features on the brake actuation shaft with a housing member, the pawl and the center section. The pawl may be installed in a first position or in a second, mirrored position.

22 Claims, 9 Drawing Sheets

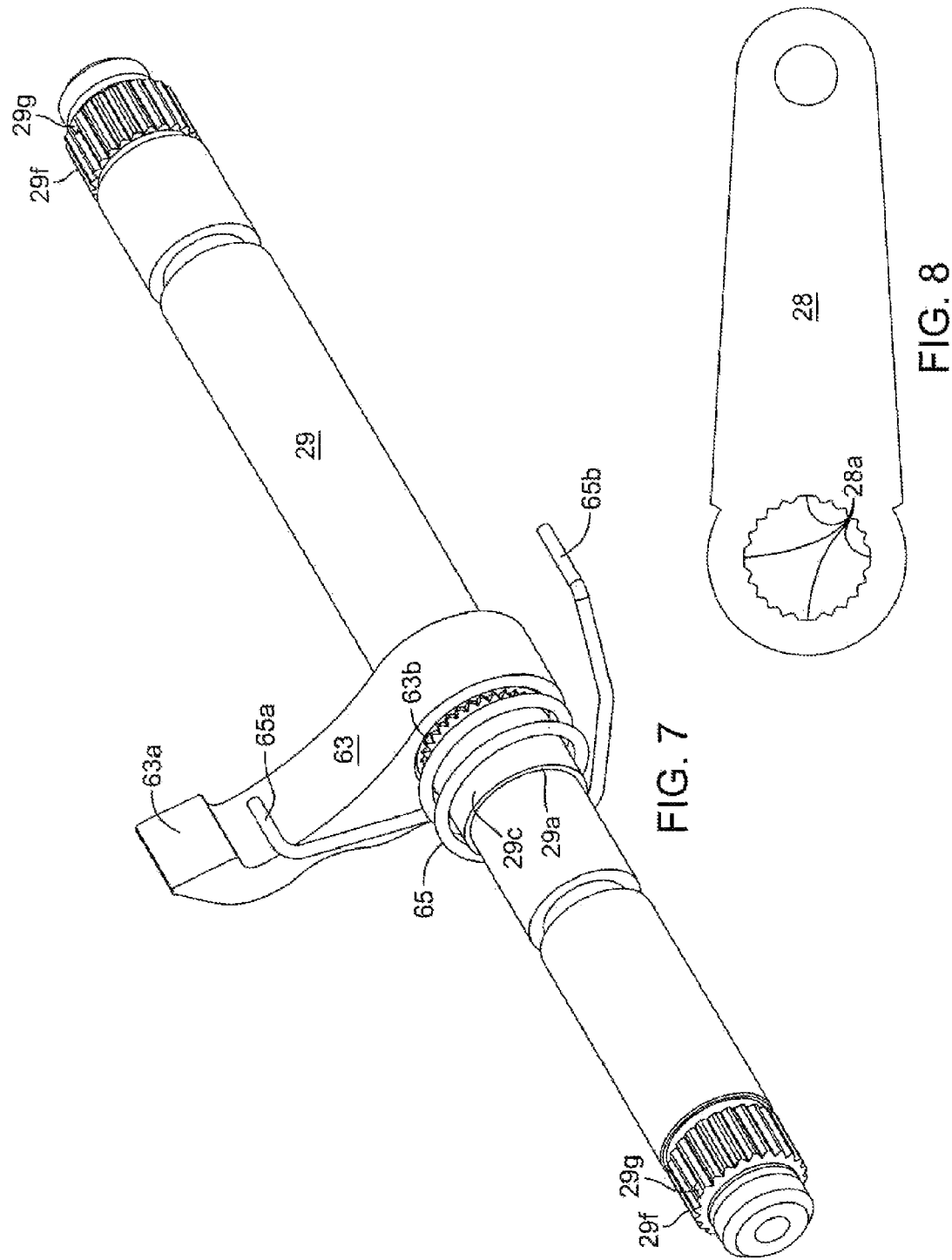

CYLINDER BLOCK BRAKE

BACKGROUND OF THE INVENTION

This invention relates to hydrostatic transaxles generally and, in particular, transaxles intended for use in zero turn vehicles and similar applications.

SUMMARY OF THE INVENTION

A brake mechanism for a hydrostatic transmission or transaxle is disclosed herein.

A better understanding of the objects, advantages, features, properties and relationships of the invention will be obtained from the following detailed description and accompanying drawings.

BRIEF DESCRIPTION OF THE DRAWINGS

FIG. 7 is a perspective view of the cylinder block brake components of the subject invention.

FIG. 8 is an elevational view of a brake actuation arm which may be used with the brake actuation shaft shown in FIG. 7.

DETAILED DESCRIPTION OF THE INVENTION

Figure 1:
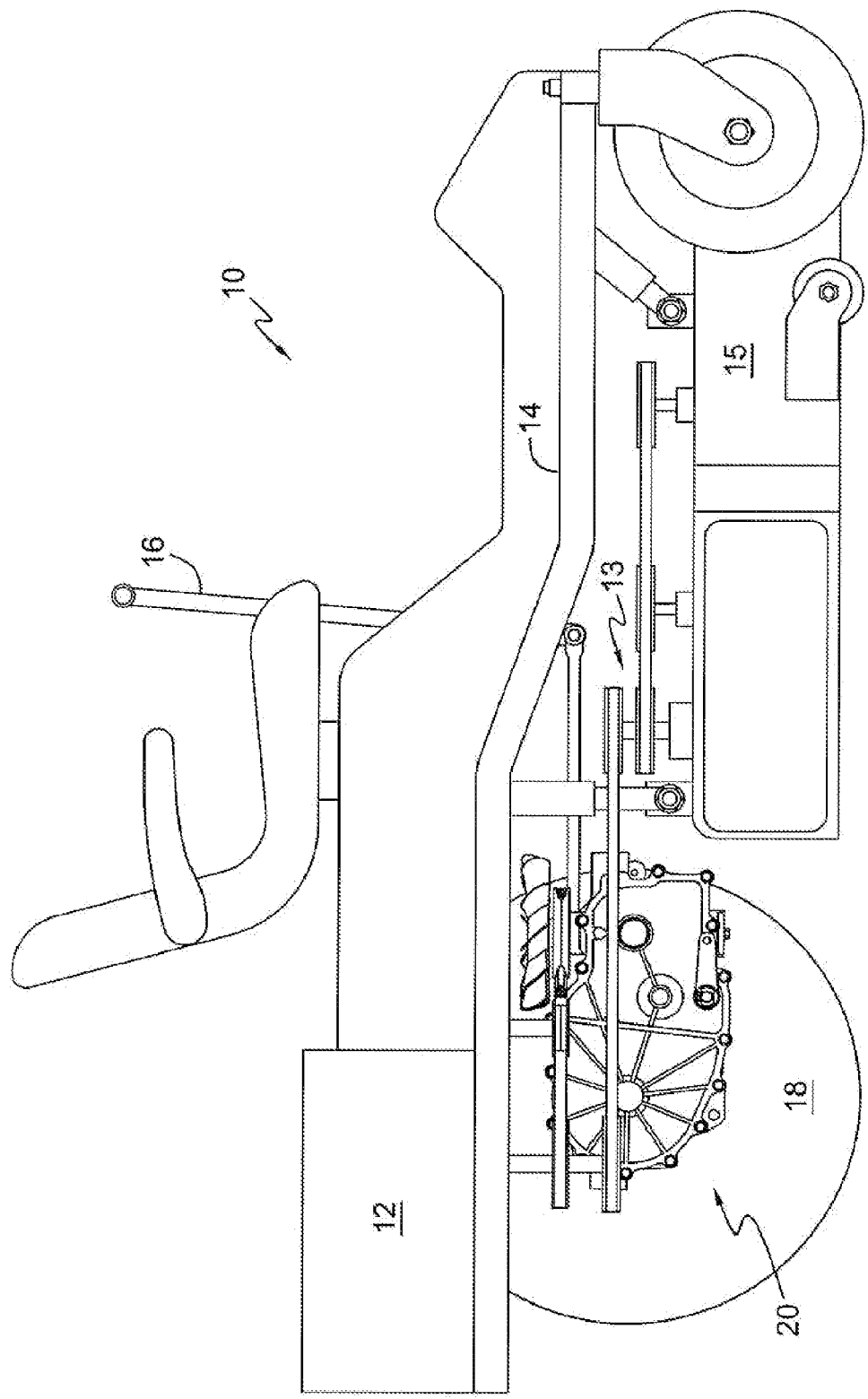
FIG. 1 is a side elevational view of an exemplary vehicle in accordance with the subject invention with one rear wheel and one drive apparatus removed for clarity.

This invention is described herein with respect to exemplary vehicle 10, which is shown in FIG. 1 with one rear wheel and one driving unit removed for clarity. It will be understood that other vehicles and applications can be used in accordance with the present invention.

Hydrostatic transaxles are well-known in the art, and the internal functioning of the various components, such as the pump, motor, hydraulic porting and the like are described, for example, in U.S. Pat. Nos. 5,314,387 and 6,185,936, which are commonly owned with this application and which are incorporated herein by reference.

In general, vehicle 10 includes a prime mover or engine 12 and a pair of transaxles 20 mounted on frame 14 and having a pair of driven wheels 18. Such vehicles generally include a driven apparatus such as mower deck 15, which may be connected to engine 12 through a belt and pulley assembly 13.

In an exemplary embodiment, two user controls 16 are mounted in vehicle 10 and connected to respective transaxles 20 to control the output speed and direction thereof. It will be understood that there will be additional linkages and the like that are not depicted herein for the sake of simplicity, such as engine controls and brake linkages. Additionally, methods of controlling transaxles 20 other than that depicted are known and may be used in connection with the inventions disclosed herein.

Transaxle 20 is shown in more detail in FIGS. 2-5. A main housing 21 is joined to side housing 22 along a split line perpendicular to output axle 24 to form an oil sump 25. An externally mounted filter 26 is shown for filtering oil from sump 25 prior to entering hydraulic passages in center section 40. An optional fan 33 is shown attached to input shaft 34. In a typical zero turn vehicle arrangement, two such transaxles 20 would be used, and each may be a mirror image of the other. In a typical IHT arrangement, such as that shown in U.S. Pat. No. 5,314,387, a single transaxle unit includes two axles.

Figure 3:
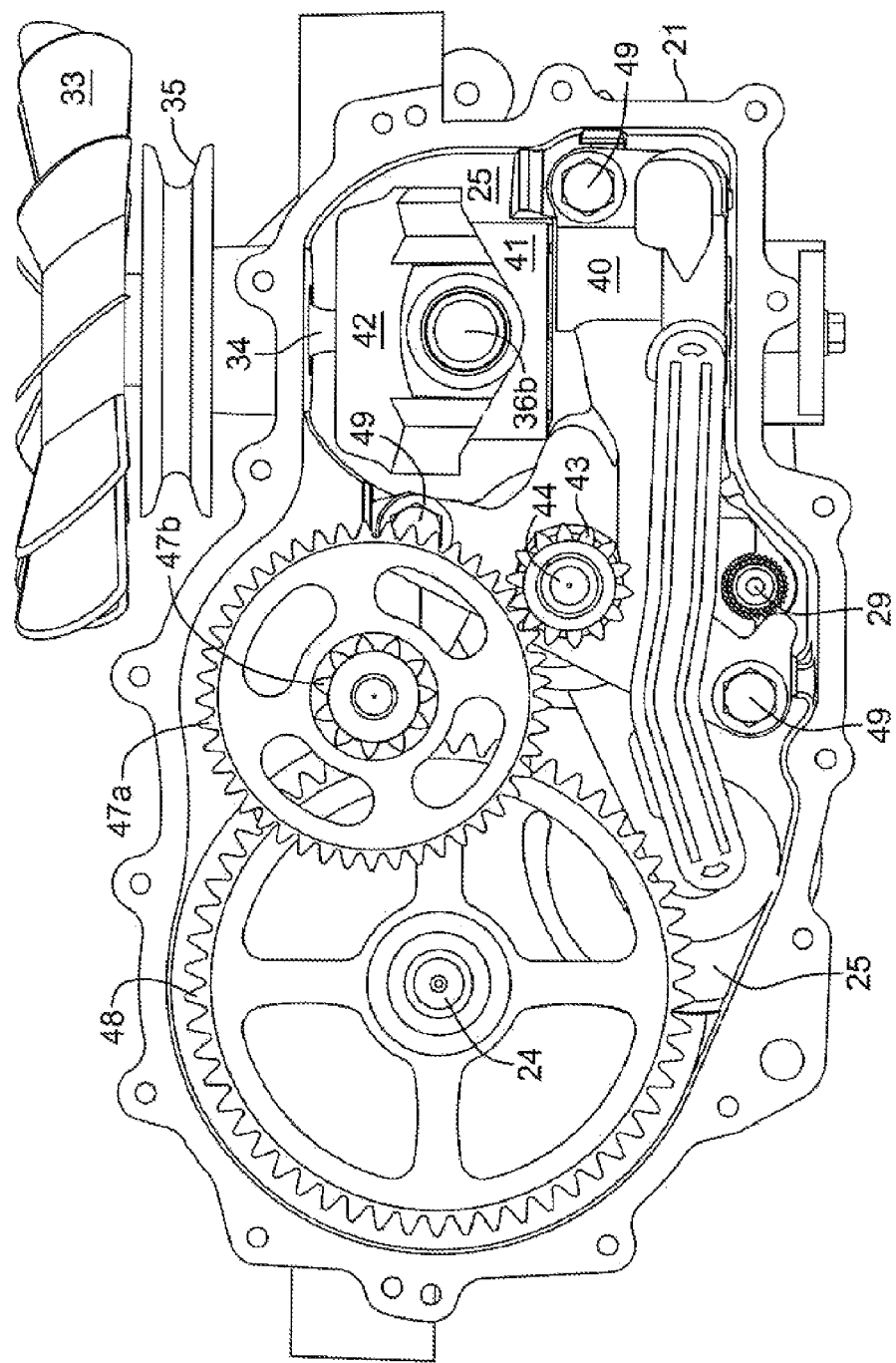
FIG. 3 is a side elevational view of the transaxle shown in FIG. 2, with one housing cover removed to show the internal structure of the unit.
Figure 6:
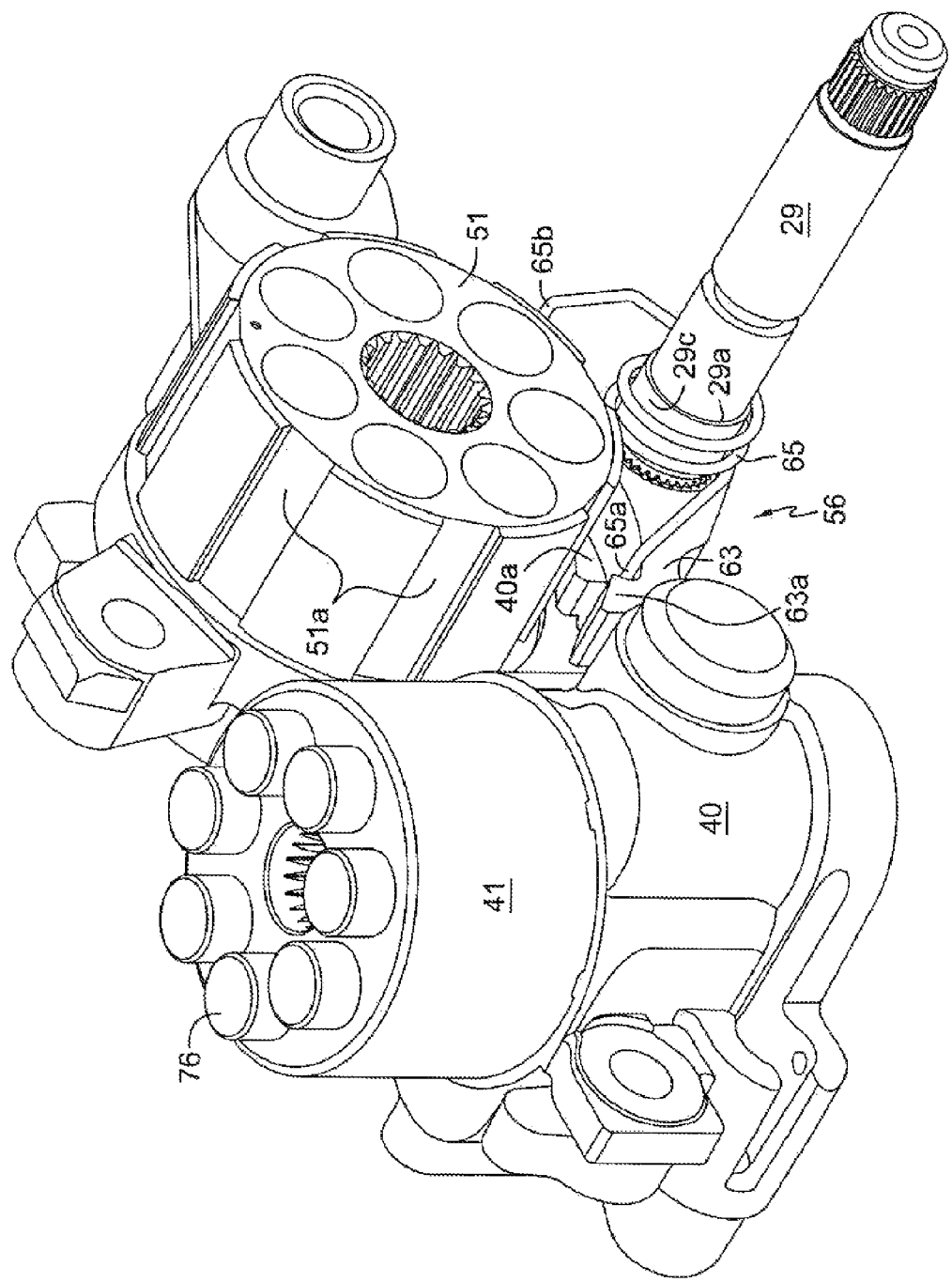
FIG. 6 is a perspective view of a center section including a pump cylinder block with pistons shown, a motor cylinder block with pistons removed for clarity, and cylinder block brake components of the subject invention.
Figure 10:
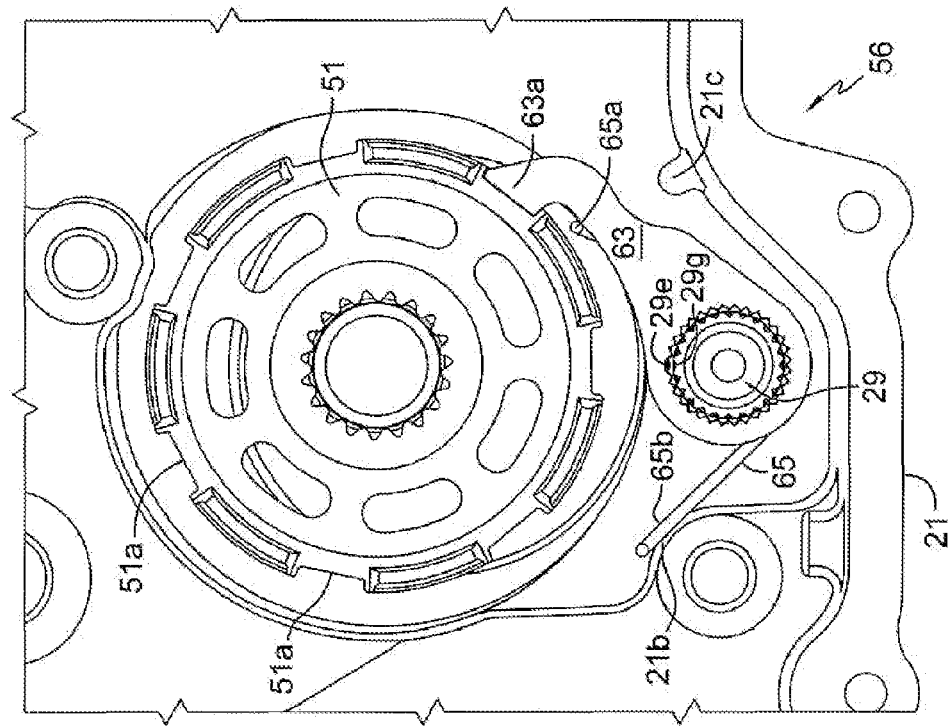
FIG. 10 is an elevational detail view identical to FIG. 9 but with the brake mechanism shown in the engaged position.

FIG. 3 shows an internal view of transaxle 20. As seen, center section 40 may be secured to main housing 21 through a plurality of bolts 49, or other known means. As is known in the art, input shaft 34, which is driven by pulley 35, drives rotatable pump cylinder block 41, which includes a plurality of axial pistons 76 as seen in FIG. 6. Pump cylinder block 41 is hydraulically connected to motor cylinder block 51 through hydraulic porting (not shown) in center section 40.

Figure 4:
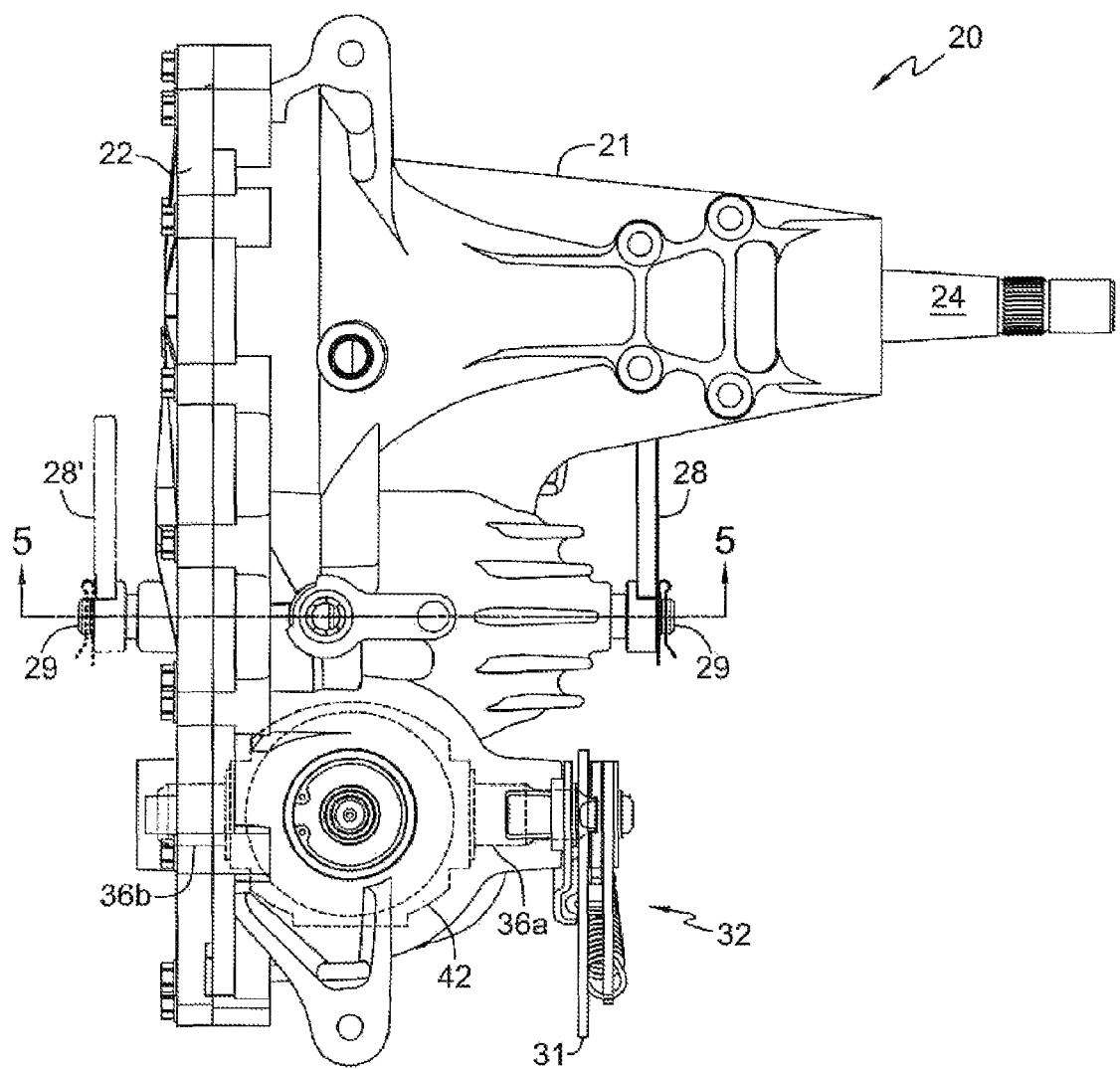
FIG. 4 is a top plan view of the transaxle shown in FIG. 2.
Figure 5:
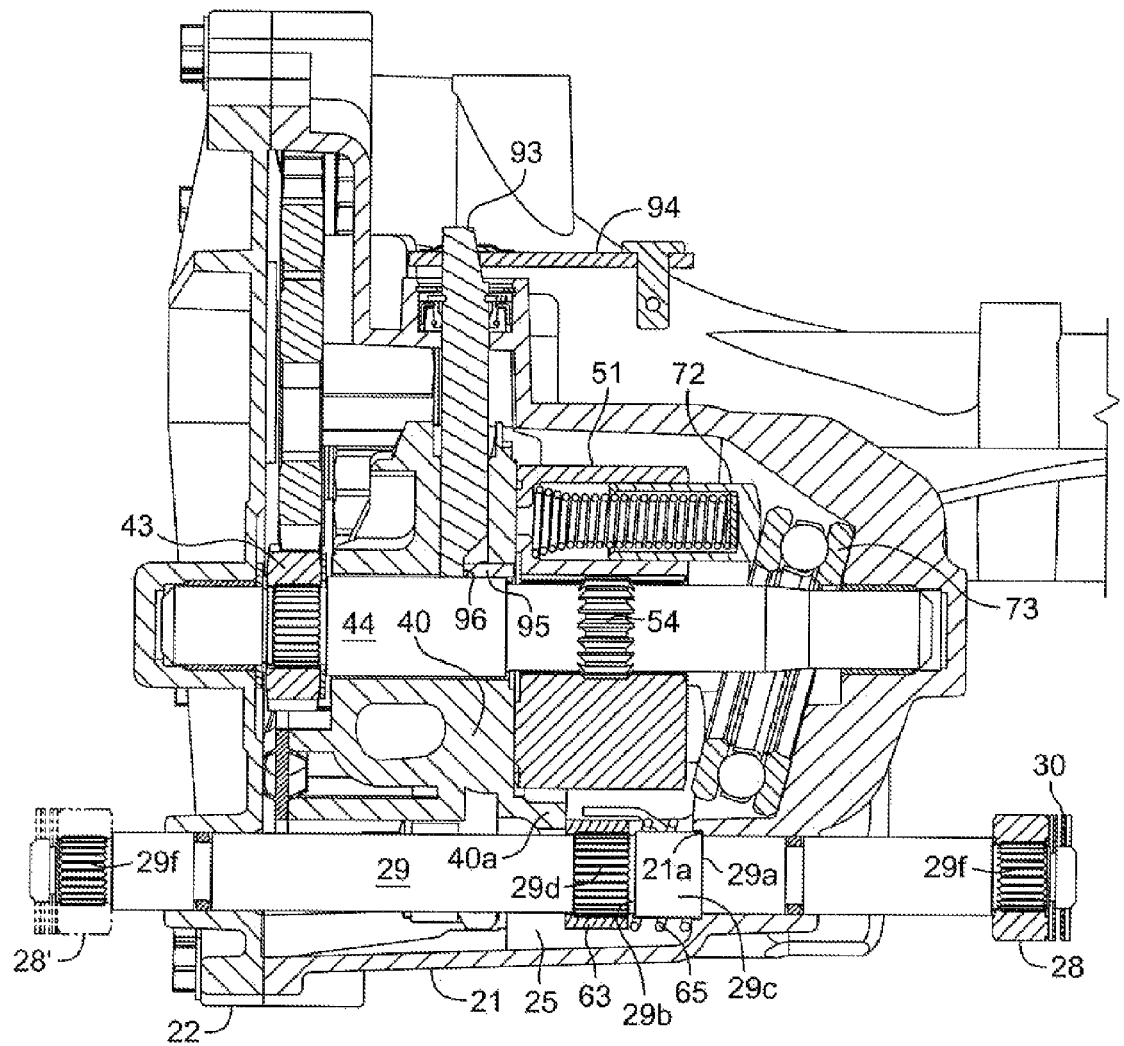
FIG. 5 is a cross sectional view of the transaxle of FIG. 2 along the lines 5-5 in FIG. 4.

An exemplary motor piston 72 is shown in FIG. 5 contacting thrust bearing 73. As is known in the art, motor thrust bearing 73 can be supported entirely within housing 21 at a fixed angle. The pump pistons 76 contact a similar thrust bearing (not shown) housed in moveable swash plate 42, which is connected to control arm 31 through trunnion shaft 36a, shown in phantom in FIG. 4, to control the output of pump cylinder block 41. It will be understood that trunnion 36b could extend through side housing 22 and have control arm 31 attached thereto. A return to neutral feature 32 can optionally be mounted on transaxle 20. Return to neutral mechanisms such as return to neutral feature 32 are well known in the art; for a more detailed description of return to neutral features, see commonly owned U.S. Pat. No. 6,968,687, the contents of which are hereby incorporated by reference.

In the exemplary embodiment shown in FIG. 5, motor output shaft 44 is driven by cylinder block 51 and has a gear 43 engaged thereto. A gear train comprising gear 43, intermediate gears 47a and 47b, and output gear 48, transfers rotational force from motor output shaft 44 to output axle shaft 24.

The exemplary embodiment also uses a bypass mechanism, which is well known in the art and will only be described briefly herein. For a more detailed description of a bypass mechanism, see commonly owned U.S. Pat. Nos. 6,256,989 and 6,651,427, the contents of which are hereby incorporated by reference. To place transaxle 20 into hydraulic bypass mode, a bypass actuator shaft 93 may be rotated by means of handle 94. Cam 96 on the bottom end of actuator shaft 93 acts to move puck 95 to the right, lifting motor cylinder block 51 off the running surface of center section 40, breaking the hydraulic seal and permitting oil to exit the hydraulic circuit to sump 25. In order to roll the vehicle while in bypass mode, the subject invention brake mechanism must be in the disengaged mode, as discussed in detail below.

Figure 2:
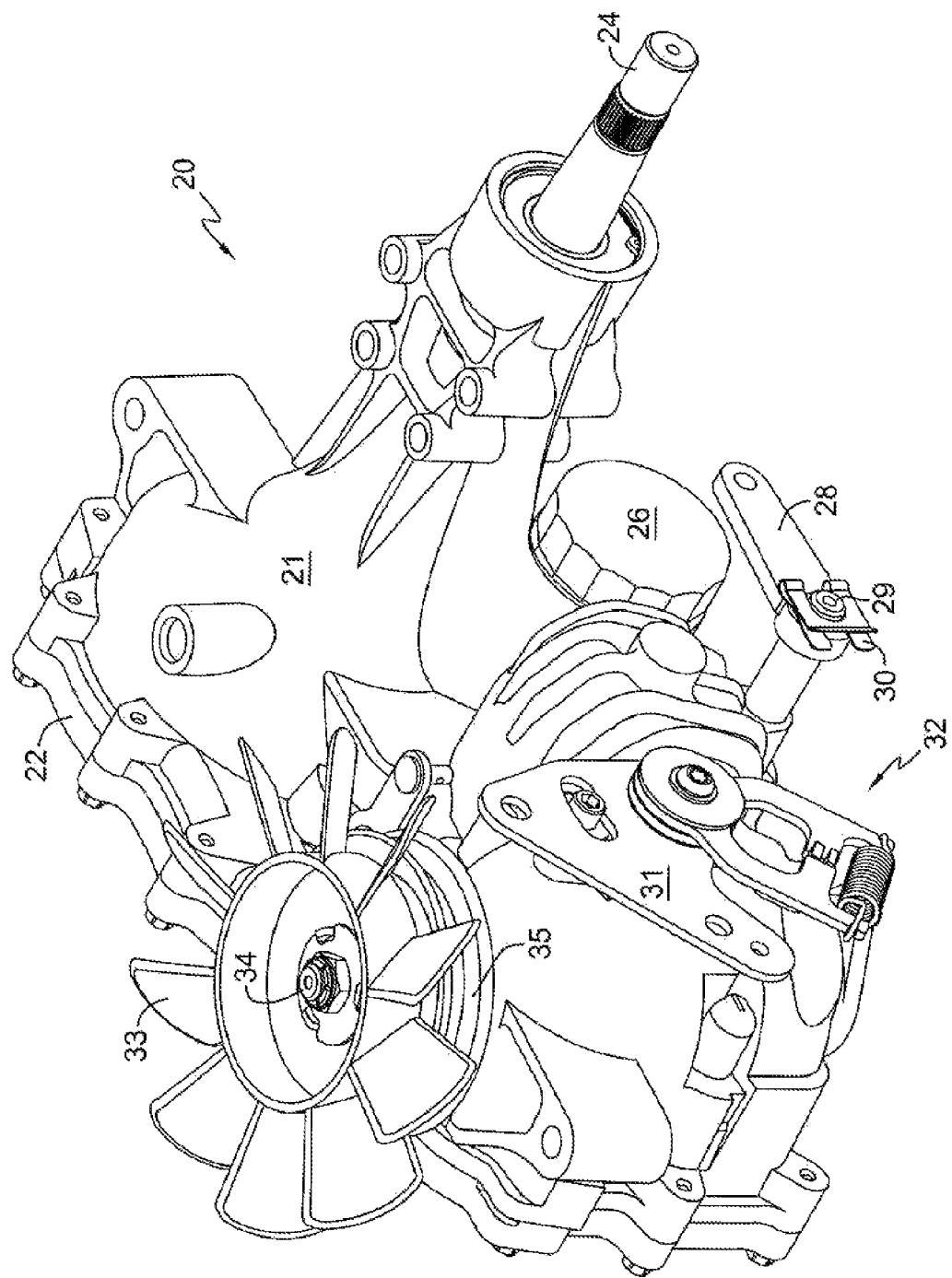
FIG. 2 is a perspective view of an exemplary hydrostatic transmission in accordance with the subject invention.

As shown in FIGS. 4 and 5, brake actuation shaft 29 extends from both main housing 21 and side housing 22. Brake actuation arm 28 shown in FIGS. 2, 4 and 5 is engaged to splines 29f at a first end of brake actuation shaft 29 on the outboard side of transaxle 20, and retained with clip 30. Optionally, it is possible to mount brake actuation arm 28' on the inboard side of transaxle 20. In this embodiment, actuation arm 28' will be engaged to splines 29f formed on the inboard end of brake actuation shaft 29. This option gives the user assembling transaxle 20 on a vehicle flexibility in the location of the brake linkage (not shown).

It will be appreciated by those in the art that it is not required that both ends of shaft 29 have splines or that both ends protrude from housing members. A shaft with splines on only one end could be produced at lower cost. Penetration of only one housing member would eliminate the need for sealing at one end of the shaft and the possibility of leakage through a second seal.

It is also possible to support the brake actuation shaft in housing 21 only, provided that adequate bearing surface is made available in housing 21 to accommodate the loads applied to the shaft during operation.

Optionally, a brake actuation shaft with an outboard actuation arm 28 could be supported by using a combination of housing 21 as shown and center section 40 with modification to center section portion 40a to provide inboard support for shaft 29 while continuing to serve as the inboard stop for pawl 63, as described in detail below. This design would result in a relatively short actuation shaft which could be terminated approximately at the inboard side of portion 40a.

In lieu of the illustrated spline and clip design, many other methods of affixing actuation arm 28 to shaft 29 are known, such as use of a keyway, pinning, riveting, staking, welding, or fastening with screws, nuts or other hardware. Illustration of the spline and clip method should not be construed as limiting to the scope of this invention.

Figure 9:
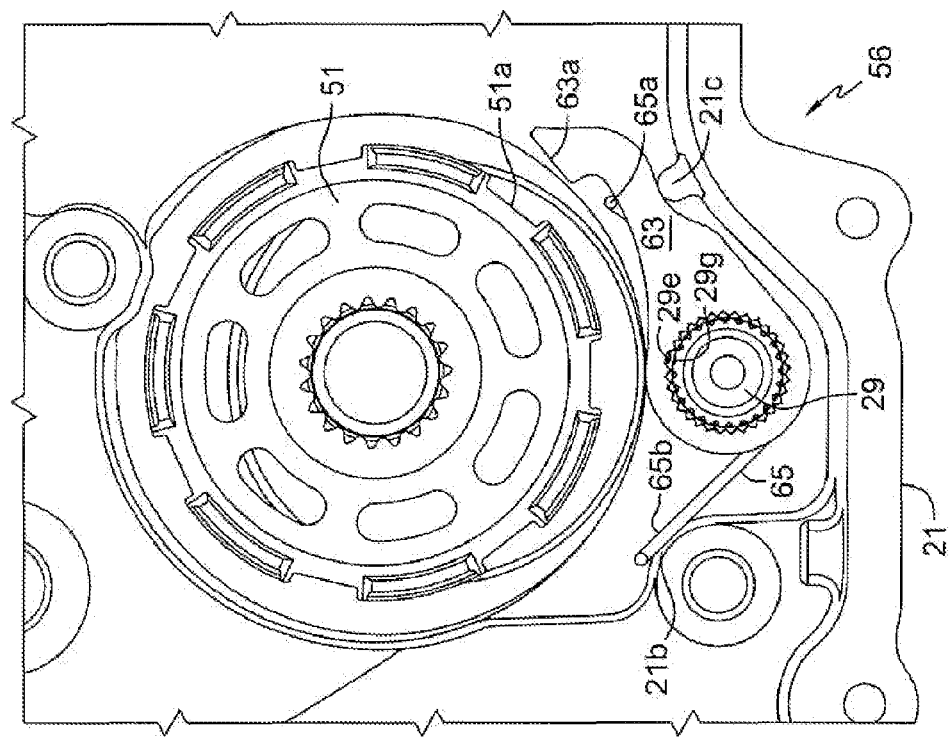
FIG. 9 is an elevational view of selected components of the transaxle shown in FIG. 3, specifically, a motor cylinder block and brake mechanism mounted in a housing, and with the brake mechanism shown in the disengaged position.

An embodiment of brake assembly 56 can be seen in FIGS. 5-10. Brake actuation shaft 29 is inserted into housing 21 from the inboard side until shoulder 29a of shaft 29 contacts stop surface 21a of housing 21. Stop surface 21a limits movement of shaft 29 in the outboard direction. Optional brake pawl return spring 65 may be installed over larger diameter portion 29c of shaft 29, adjacent to housing 21 as seen in FIG. 5. Optional spring 65 is normally not required when transaxle 20 is mounted as shown in FIG. 1. There are a variety of factors that may affect the need for optional spring 65. For example, a small clearance between pawl 63 and motor cylinder block 51 may necessitate the use of a spring to prevent pawl 63 from being pulled into motor cylinder block 51 by the low pressure zone that exists adjacent to rapidly flowing liquids. Also, inverted installation of transaxle 20 may cause pawl 63 to move toward motor cylinder block 51 by the force of gravity. As seen in FIGS. 5, 7 and 9, brake pawl 63 is installed engagingly onto splines 29d with spring end 65a engaging pawl 63 and spring end 65b contacting stop surface 21b of housing 21. As seen in FIG. 5, when center section 40 is installed, stop portion 40a is in position to limit inboard movement of pawl 63. Inboard movement of shaft 29 is restricted by shoulder 29b coming into contact with pawl 63, which can move no further inboard than stop portion 40a allows. This arrangement eliminates the need for additional means for retaining shaft 29 in the axial direction.

Pawl 63, stop surfaces 21a and 40a, and shoulders 29a and 29b are positioned and toleranced such that axial movement of shaft 29 and pawl 63 is limited but not prevented and rotational movement of shaft 29 and pawl 63 about the longitudinal axis of shaft 29 is not restricted by any incidental contact of any of these surfaces with one another.

The torsional spring force of spring 65 biases pawl 63 in its disengaged position against stop 21c of housing 21 as shown in FIG. 9. The brake may be engaged by rotating shaft 29 with sufficient torque to overcome the torsional spring force of spring 65, thereby rotating engagement end 63a of pawl 63 into contact with cylinder block 51 and into one of a plurality of slots 51a in cylinder block 51, stopping and preventing rotation of cylinder block 51, thereby braking the transaxle. As shown, the line of action or force vector of pawl 63 is through spline 54 on motor shaft 44 in order to minimize the possibility of tipping cylinder block 51. The line of action need not, however, be in the center of spline 54.

In order to ensure longer life of this brake assembly, engagement portion 63a of pawl 63 may be formed from a harder material than the walls of slots 51a, so that engagement portion 63a will receive minimal wear and substantially maintain its shape. As one example, motor cylinder block 51 may be formed from powdered metal material FC-0208-50 and pawl 63 may be formed of a heat treated powdered metal material in the FN-0208 group, such as FN-0208-130HT.

Brake engagement can be maintained externally in numerous ways, by securing brake arm 28 into the engaged position. This engagement can be accomplished in numerous ways, such as by means of solenoid activation or deactivation or by servomotor. It can also be accomplished by having the vehicle linkage comprise a clamping or locking device, many varieties of which are known.

An alignment or clocking feature 29e is formed on splined portion 29d of shaft 29 and interfaces with a mating feature 63b formed on pawl 63. A similar clocking feature 29g may be formed on splined portion 29f at each end of shaft 29 to provide for specified orientations of brake arm 28 in relation to pawl 63 during assembly. Brake arm 28 includes a plurality of mating features 28a for flexibility in positioning brake arm 28 on shaft 29 to accommodate various vehicle linkage configurations. Four brake arm positions are available at 90 degree intervals using brake arm 28 as shown. However, the quantity, location and specific geometric details of the clocking features may be varied to suit the user. Furthermore, while desirable as an assembly aid, the clocking features are not required.

Brake actuation arm 28, modified by omitting clocking features, may be mounted in a variety of positions spanning 360 degrees by rotating it about the longitudinal axis of brake actuation shaft 29 prior to assembling over splines 29f shown on each end of the shaft. One actuation arm position for each spline tooth would be available and a greater or lesser quantity of spline teeth than that shown could be used.

Figure 11:
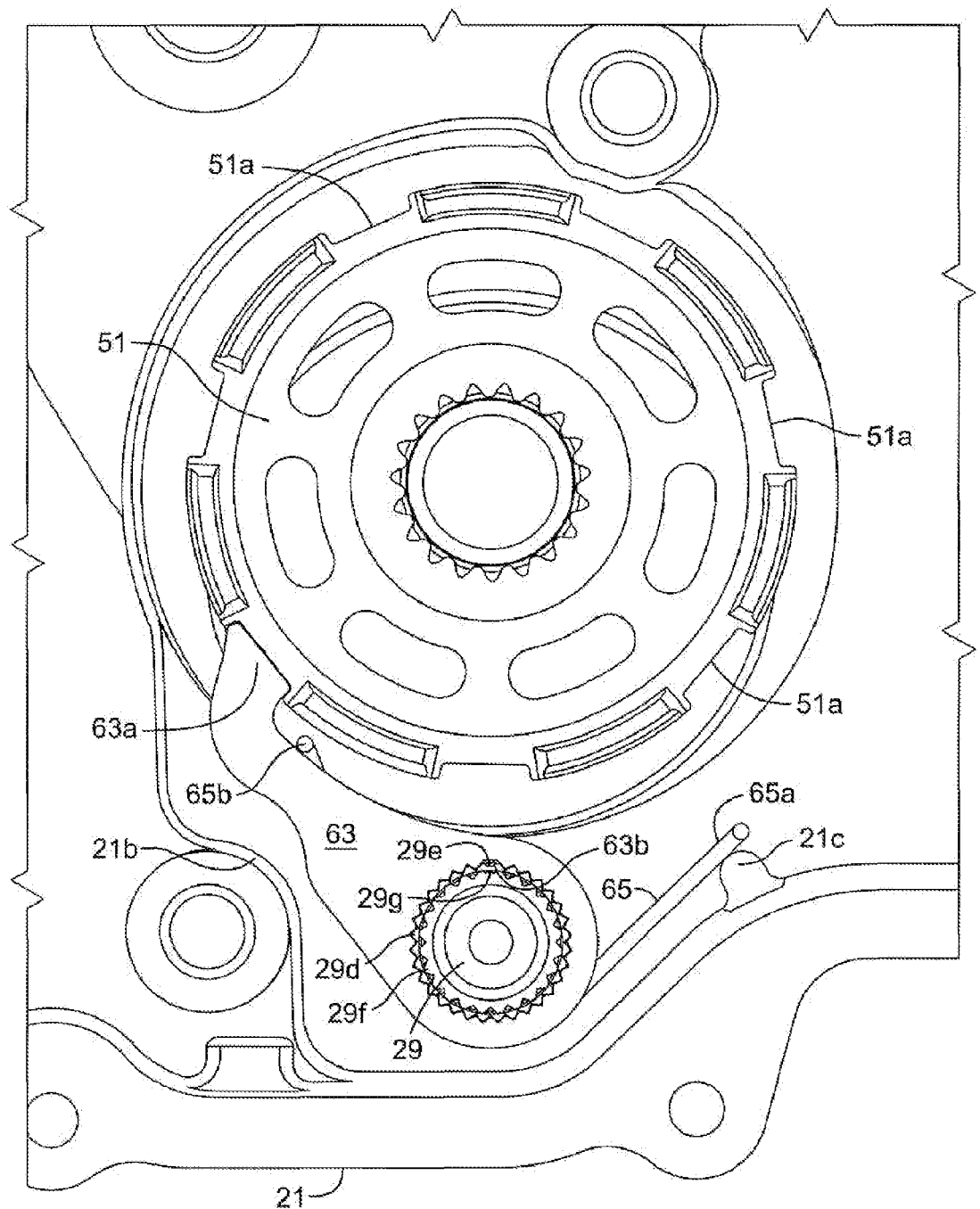
FIG. 11 is an elevational detail view identical to FIG. 10 but with the pawl of the brake mechanism shown in an optional mirrored orientation.

An alternative orientation of pawl 63 is depicted in FIG. 11, which uses the same components as described previously herein but with pawl 63 in a position mirrored about a vertical plane parallel to and intersecting the longitudinal axis of shaft 29. In this orientation, spring end 65b engages pawl 63 and spring end 65a contacts stop surface 21c of housing 21. Pawl 63 may be flipped and assembled in this manner without changing the basic position of any other parts in the assembly. This enables the assembler to select a preferred orientation of pawl 63 in relation to the primary rotational direction of cylinder block 51 during normal operation to ensure the best possible engagement and wear characteristics of the brake mechanism.

While the necessary amount of rotation of shaft 29 to cause full engagement of pawl 63 into one of a plurality of slots 51a in cylinder block 51 is illustrated in these figures to be approximately 13 degrees, it will be understood that this can be modified and is dependent on many factors, including the size and geometry of the pawl, spring, and housing. The partial symmetry of the illustrated design which allows installation of pawl 63 in a reverse, mirrored position is not required to achieve basic functionality of the design.

While specific configurations of the invention have been described in detail, it will be appreciated by those skilled in the art that various modifications and alternatives to those details could be developed in light of the overall teachings of the disclosure.

The particular arrangements disclosed herein are meant to be illustrative only and not limiting as to the scope of the invention which is to be given the full breadth of the appended claims and any equivalents thereof.

The invention claimed is:

1. A hydraulic drive apparatus, comprising:
   a housing;
   a rotatable motor cylinder block mounted in the housing;
   a plurality of slots formed on the periphery of the rotatable motor cylinder block;
   a motor output shaft engaged to and driven by the motor cylinder block;
   a brake actuation shaft rotatable between a first position and a second position, the brake actuation shaft comprising a first end extending from the housing parallel to the motor output shaft; and
   a pawl mounted on the brake actuation shaft and positioned adjacent to the motor cylinder block such that rotation of the brake actuation shaft to the first position will rotate the pawl toward the motor cylinder block to engage one of the plurality of slots and brake the rotatable motor cylinder block.

2. The hydraulic drive apparatus as set forth in claim 1, wherein the housing comprises a main housing and a side housing, and the brake actuation shaft is at least partially supported by the main housing.

3. The hydraulic drive apparatus as set forth in claim 2, wherein the brake actuation shaft is at least partially supported by the side housing.

4. The hydraulic drive apparatus as set forth in claim 1, further comprising a separate center section mounted in the housing and having hydraulic porting formed therein, wherein the motor cylinder block is rotatably mounted on the center section.

5. The hydraulic drive apparatus as set forth in claim 4, further comprising a rotatable pump cylinder block disposed on the center section and hydraulically connected to the motor cylinder block through the hydraulic porting, and a pump input shaft extending into the housing to engage and drive the pump cylinder block.

6. The hydraulic drive apparatus as set forth in claim 5, wherein the axis of rotation of the pump input shaft is perpendicular to the axis of rotation of the brake actuation shaft.

7. The hydraulic drive apparatus as set forth in claim 2, wherein the brake actuation shaft extends out of both the main housing and the side housing.

8. The hydraulic drive apparatus as set forth in claim 1, further comprising at least one axle mounted in the housing and drivingly engaged to the motor output shaft through a gear train.

9. The hydraulic drive apparatus as set forth in claim 1, further comprising a pawl return spring engaged to the pawl and the housing, wherein the return spring biases the pawl away from engagement with the motor cylinder block.

10. The hydraulic drive apparatus as set forth in claim 1, wherein the pawl is designed such that said pawl may be mounted on the brake actuation shaft in a first or a second orientation, such that when the pawl is mounted in the first orientation, rotation of the brake actuation shaft toward the first position engages the pawl with one of the plurality of slots, and when the pawl is mounted in the second orientation, rotation of the brake actuation shaft toward the second position engages the pawl with one of the plurality of slots.

11. A braking mechanism for a hydraulic drive apparatus comprising a housing, a center section mounted in the housing and a hydraulic pump cylinder block rotatably mounted on the center section, the braking mechanism comprising:
    a hydraulic motor cylinder block driving a motor shaft and rotatably mounted on the center section, the hydraulic motor cylinder block having at least one slot formed thereon;
    a brake actuation shaft supported at least partially by the housing and comprising a proximal end and a distal end, the brake actuation shaft rotatable with respect to the housing in a first direction and a second direction opposite the first direction, wherein the axis of rotation of the brake actuation shaft is parallel to the axis of rotation of the motor shaft;
    a pawl mounted on the brake actuation shaft between the proximal end and the distal end and positioned adjacent to the motor cylinder block, wherein rotation of the brake actuation shaft rotates the pawl between a first position, where the pawl is not engaged to the motor cylinder block, and a second position, where the pawl is engaged to the at least one slot of the motor cylinder block; and
    a pawl return spring engaged to the pawl and the housing, wherein the return spring biases the pawl to the first position.

12. The braking mechanism as set forth in claim 11, further comprising a plurality of slots formed on the motor cylinder block, wherein the pawl engages one of the plurality of slots when the pawl is moved into the second position.

13. The braking mechanism as set forth in claim 12, wherein the brake actuation shaft and the motor output shaft lie in a plane that is perpendicular to a pump running surface, on which the hydraulic pump cylinder block is rotatably mounted, and a motor running surface, on which the hydraulic motor cylinder block is rotatably mounted.

14. The braking mechanism as set forth in claim 11, further comprising a pump input shaft drivingly engaged to the hydraulic pump cylinder block, wherein the pump input shaft is perpendicular to the brake actuation shaft.

15. The braking mechanism as set forth in claim 11, wherein the proximal and distal ends of the brake actuation shaft extend from opposite sides of the housing.

16. The braking mechanism as set forth in claim 15, wherein both the proximal and distal ends of the brake actuation shaft are formed to permit an external brake arm to be mounted thereon.

17. The braking mechanism as set forth in claim 11, wherein the distal end of the brake actuation shaft extends from the housing, and the proximate end of the brake actuation shaft is supported by the center section.

18. The braking mechanism as set forth in claim 11, wherein the distal end of the brake actuation shaft extends from a first side of the housing, and the proximate end of the brake actuation shaft is supported by a second side of the housing, opposite the first side.

19. The braking mechanism as set forth in claim 11, wherein rotation of the brake actuation shaft in the first direction moves the pawl into the second position.

20. The braking mechanism as set forth in claim 11, wherein rotation of the brake actuation shaft in the second direction moves the pawl into the second position.

21. A hydraulic drive apparatus comprising:
    a housing;

a center section disposed within the housing;

a hydraulic pump rotatably disposed on the center section and driven by a pump input shaft;

a hydraulic motor rotatably disposed on the center section and comprising a plurality of slots formed on its periphery, the hydraulic motor hydraulically connected to the hydraulic pump and driving a motor output shaft;

a brake actuation shaft extending from the housing parallel to the motor output shaft, the brake actuation shaft rotatable between a first position and a second position; and a pawl disposed on the brake actuation shaft and movable between a first position, where it is engaged to the one of the plurality of slots, and a second position where it is not engaged to one of the plurality of slots, the pawl comprising a proximate end, disposed on the brake actuation shaft, and a distal end, extending from the proximate end and radially away from the brake actuation shaft, wherein the distal end engages one of the plurality of slots when the pawl is in the first position.

22. The hydraulic drive apparatus as set forth in claim 21, further comprising a pawl return spring engaged to the pawl and the housing, wherein the return spring biases the pawl to the second position.

* * * * *

UNITED STATES PATENT AND TRADEMARK OFFICE
CERTIFICATE OF CORRECTION

| | | |
|---|---|---|
| PATENT NO. | : 7,926,624 B1 | Page 1 of 1 |
| APPLICATION NO. | : 11/744618 | |
| DATED | : April 19, 2011 | |
| INVENTOR(S) | : Michael W. Taylor | |

It is certified that error appears in the above-identified patent and that said Letters Patent is hereby corrected as shown below:

In Claim 13, Column 6, Line 35 delete "output".

Signed and Sealed this
Thirtieth Day of October, 2012

David J. Kappos
*Director of the United States Patent and Trademark Office*